May 29, 1934. H. D. EDWARDS 1,960,623
REFRIGERATING SYSTEM
Filed May 9, 1931
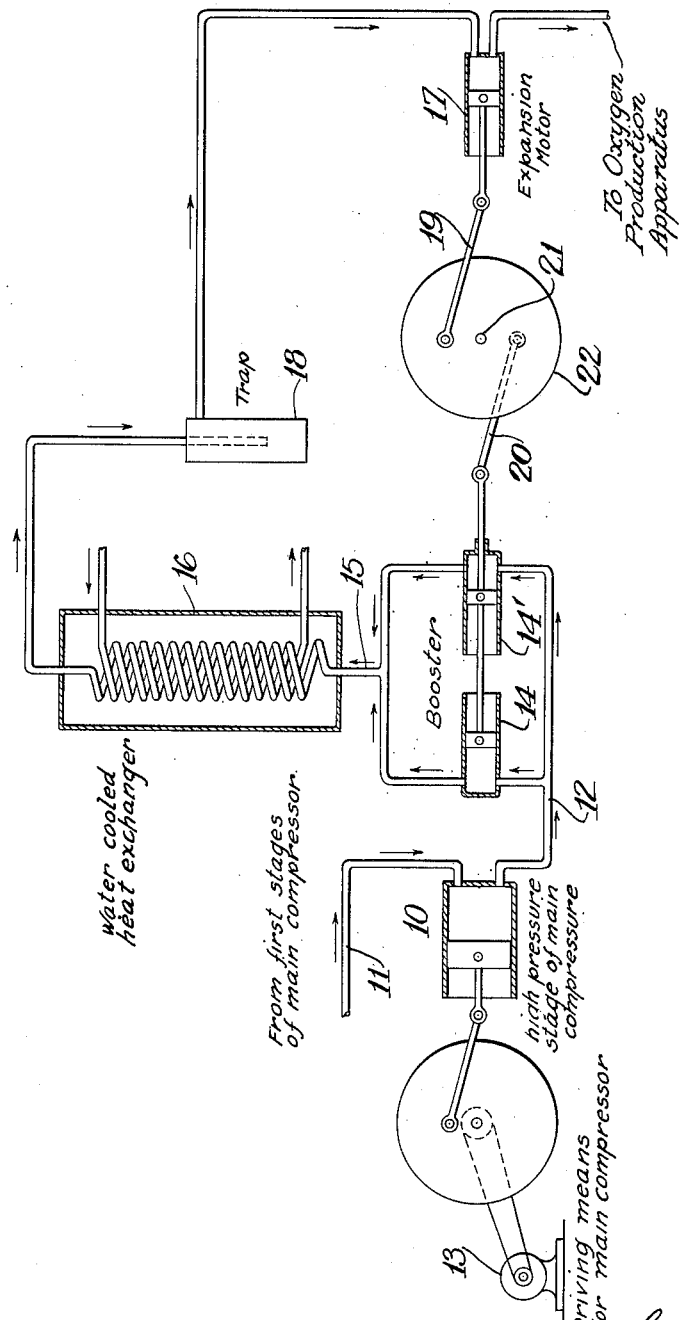
INVENTOR:
Harry D. Edwards,
BY ATTORNEYS
Byrnes, Townsend & Potter.

Patented May 29, 1934

1,960,623

UNITED STATES PATENT OFFICE 1,960,623

REFRIGERATING SYSTEM

Harry D. Edwards, Larchmont, N. Y., assignor to The Linde Air Products Company, a corporation of Ohio Application May 9, 1931, Serial No. 536,248

5 Claims. (Cl. 62—136)

My invention relates to refrigerating systems of the type in which a fluid is compressed, then cooled, and then expanded. In many such systems, the fluid is expanded through a simple orifice or nozzle, and its temperature is thereby lowered through the Joule-Thomson effect; but in other systems, the expanding fluid is caused to do external work, for example, to drive a motor. The invention is concerned with systems of the latter type, that is, systems in which an expansion motor is used.

In certain processes, for example in the familiar low-temperature processes of preparing oxygen from air, cooling by the expansion of compressed gas is utilized on a large scale; and where the expanding gas is caused to drive a motor, the possibility of using the power developed by the latter for some useful purpose immediately suggests itself. Nevertheless, attempts to utilize the power of the expansion motor have resulted unsatisfactorily; and to provide a load for the motor, the latter is often connected to an electrical generator, the output of which is dissipated in resistors provided for that purpose. The difficulty in usefully applying the power developed by the motor is due to several causes, the principal one being that the natural order of regulating the motor to meet the needs of the load must be reversed, and the load must conform to the variable output of the motor, even to the extent of falling to zero when the requirements of the refrigerating process result in the shutting down of the motor. It is only in rare instances that useful work can be done economically with such a power supply.

An object of the invention is to provide a useful load for the expansion motor of a refrigerating system of the kind described, so modifying the system that under various conditions of operation, including shut down, the load of the motor shall not suffer from an excess or deficiency of power.

Another object is to attain the foregoing result with apparatus of simple construction, economical with respect to supervision and maintenance.

The objects of the invention are accomplished by compressing in at least two distinct stages the fluid to be cooled by expansion in a motor, and arranging the motor so that it furnishes power to only a part of these stages, all as more particularly hereinafter described.

For a fuller understanding of the nature and objects of the invention, reference should be had to the following detailed description taken in connection with the accompanying drawing, in which:

The figure is a diagrammatic illustration, parts being shown in section, of a refrigerating system constructed in accordance with the invention.

Referring now to the drawing, 10 denotes a main compressor which may have one or more stages, and is shown receiving a gaseous medium to be compressed through conduit 11 and exhausted through conduit 12. This compressor is driven by any suitable independent source of power, for example, an electric motor 13, and is run at substantially constant speed. The gaseous medium compressed may be drawn from any convenient source, for example, from the atmosphere at normal atmospheric pressure.

The compressed medium which passes from the main compressor through conduit 12 may be passed through cooling apparatus if desired, such cooling apparatus being omitted from the drawing in the interests of clearness of illustration. Conduit 12 leads to and discharges all of the compressed medium, into another compressor here shown as comprising cylinders 14 and 14', operating in parallel, but in opposite phases. This latter compressor is arranged to elevate or boost the pressure to a relatively high value. The medium compressed to this high value leaves the second compressor or "booster" by way of conduit 15, which preferably includes a cooling apparatus or heat exchanger that may be water cooled as shown in the drawing. While but one exchanger is shown at this point, it is obvious that such cooling may with advantage be effected in stages by means of a plurality of exchangers.

The highly compressed cooled medium is then passed to an expansion motor or engine 17, having had any condensation first removed by suitable means, for example by a trap, as shown at 18. By the present invention, the work done externally by the medium expanding in the motor 17 is utilized to drive the booster and is accordingly shown as mechanically coupled in driving relation therewith. The coupling shown includes connecting rods 19 and 20, connected respectively to the expansion motor and booster and to a common driving shaft 21, the latter having a fly-wheel 22, whereby through the inertia of the rotating mass, the force of the expanding medium in the motor 17 carries over in each cycle to drive the booster 14 during the exhaust phase of the motor and after the admission valves of the motor have closed. Such a coupling is of a permanent character and no provision is made to change the speed of the booster with respect to that of the motor.

The medium exhausted from the expansion motor is as a rule at a pressure below the pressure of the medium supplied thereto and at a temperature which is the lowest of any present in the system. Such low temperature may be utilized for any refrigerating purpose to which it is adapted.

When my invention is applied to the liquefaction of air, the air may be, for example, at 2000 pounds per square inch on leaving the main compressor, may be compressed to 3000 pounds in the booster, and may be exhausted from the expansion motor at 75 pounds per square inch.

The booster and motor may be designed from the engineering data generally applicable to machines of their kind. The volume of gas to be handled through the booster and motor being assumed, together with the pressure change across each, the booster and motor can be built of such size as to run at any predetermined speed. The highest pressure in the system, which is reached between the booster and the expansion motor, is an important datum, and must be of the proper degree in order that the system may operate as intended. Prior to the reduction of the invention to practice, many qualified engineers were of the opinion that a constant pressure could not be maintained at the point in question without continual supervision and adjustment of the apparatus, but such apprehensions proved to be wholly unfounded. The system was shown by test to be inherently stable, and if the piston displacement of the booster, and that of the motor are of the proper magnitude, all pressures and speeds remain constant at their intended values.

Such slight inaccuracies as are liable to occur in the design can be wholly compensated by an adjustable cut-off, not shown, on the expansion motor. This device is of conventional design and determines the point in the stroke at which the intake valve closes. Once set, it requires no further attention.

It will be apparent that the power of the motor is all usefully employed, there being no excess to be wasted, and no deficit to be made up by auxiliary driving means for the booster. The booster requires power only when the expansion motor is operating and delivering power.

The system shown is only a simplified example, and the invention may take many other forms as will be apparent to those skilled in the art. An obvious modification is to operate several booster-motor units from a single main compressor, which might be situated at a distance.

I claim:

1. The method of operating a refrigerating system for producing low teperatures of a character adapted for the preparing of oxygen having compressor means for compressing a gaseous medium to a relatively high pressure in a plurality of stages and an expansion motor in which the highly compressed medium expands doing external work to achieve a refrigerating effect, which consists in applying the energy of the medium expanding in said motor to hold over through inertia and drive certain of said stages, and applying energy derived from an independent source to drive the remainder of said stages.

2. A refrigerating system for producing low temperatures of a character adapted for the preparing of oxygen comprising a main compressor in which a gaseous medium is compressed to a desired pressure, an additional compressor connected to receive the discharge from said main compressor and to boost the pressure of the compressed medium to a relatively high value, an expansion motor into which said boosting compressor exhausts and in which the highly compressed medium does external work and expands to a pressure lower than that of the supply from said main compressor, means for driving said main compressor from an independent source of energy, and means for mechanically coupling said expansion motor in driving relation with said boosting compressor; said coupling including an inertia element for storing energy during each cycle when said expansion motor operates which holds over to drive said boosting compressor.

3. A refrigerating system for producing low temperatures of a character adapted for the preparing of oxygen comprising a main compressor in which a gaseous medium is compressed to a desired pressure, an additional compressor connected to receive the discharge from said main compressor and to boost the pressure of the compressed medium to a relatively high value, an expansion motor into which said boosting compressor exhausts and in which the highly compressed medium does external work and expands to a pressure lower than that of the supply from said main compressor, a heat exchanger arranged to cool the compressed medium passing from said boosting compressor to said expansion motor, an independently regulatable electric motor for driving said main compressor, and means for mechanically coupling said expansion motor in permanent driving relation with said boosting compressor; said coupling including a fly-wheel set into rotation by the force of expansion in each cycle when said expansion motor operates which holds over to drive said boosting compressor.

4. A refrigerating system for producing low temperatures of a character adapted for the preparing of oxygen comprising a main compressor in which a gaseous medium is compressed to a desired pressure, an additional compressor connected to receive the discharge from said main compressor and to boost the pressure of the compressed medium to a relatively high value, an expansion motor into which said boosting compressor exhausts and in which the highly compressed medium does external work and expands to a pressure lower than that of the supply from said main compressor, a heat exchanger arranged to cool the compressed medium passing from said boosting compressor to said expansion motor, an independently regulatable electric motor for driving said main compressor, and a mechanical coupling for connecting said expansion motor and said boosting compressor in driving relation, said expansion motor and said boosting compressor each having reciprocating parts, a common rotating shaft associated therewith, connecting rods connecting said reciprocating parts respectively in driving relation to said shaft, and a fly-wheel secured to said shaft.

5. A refrigerating system for producing low temperatures of a character adapted for preparing oxygen from air comprising a main compressor for compressing air drawn from the atmosphere to a desired pressure, an additional compressor for boosting air compressed in said main compressor to a higher pressure, a heat exchanger, an expansion motor for expanding air compressed in said system by doing external work and decreasing the pressure to a value less than said desired pressure, means for conveying the compressed air through said heat exchanger and finally to oxygen production apparatus, independent means for driving said main compressor, and means for mechanically coupling said expansion motor in driving relation to said additional compressing means, said coupling including an inertia element for storing energy during each cycle when said expansion motor operates which holds over to drive said additional compressing means.

HARRY D. EDWARDS.